April 16, 1957 W. D. MEAGHER ET AL 2,788,766
DRIVE ARRANGEMENT FOR COATING OR ENROBING MACHINES
Filed June 12, 1953

INVENTORS:
WALTER DENIS MEAGHER
AND GEORGE MEAGHER
BY:

2,788,766
Patented Apr. 16, 1957

United States Patent Office

2,788,766

DRIVE ARRANGEMENT FOR COATING OR ENROBING MACHINES

Walter D. Meagher and George Meagher,
St. Annes-on-Sea, England

Application June 12, 1953, Serial No. 361,304

Claims priority, application Great Britain June 12, 1952

3 Claims. (Cl. 118—24)

This invention relates to machines for coating or enrobing articles with molten or plastic substances, and is particularly concerned with the power operation of the various parts of such a machine; for example, a conveyor whereby the articles under treatment are carried to and/or from the coating station, an agitator for the coating substance and means for delivering such substance against the undersides of the articles on the conveyor, a pump for feeding such substance to depositing means above the articles, and an air blower for removing excess coating from the latter.

Since the parts above-mentioned usually require to be run at different speeds, it has hitherto been the normal practice to arrange separate belt drives thereto from a main factory counter-shaft.

The object of the present invention is to provide an improved drive arrangement for a coating or enrobing machine, and more particularly one which is operated by its own electric motor.

According to this invention, an individual drive arrangement for a coating or enrobing machine comprises in combination power means, such as an electric motor, a clutch between said power means and a main driving shaft, and successive chain or like drives between said mainshaft and various working parts of the machine.

For example, the mainshaft may be connected, firstly to an article conveyor through the medium of a variable gear, so that such conveyor can be driven at a variety of different speeds, and secondly to other auxiliaries whose working speeds may bear a constant relation one with another.

Figure 1:
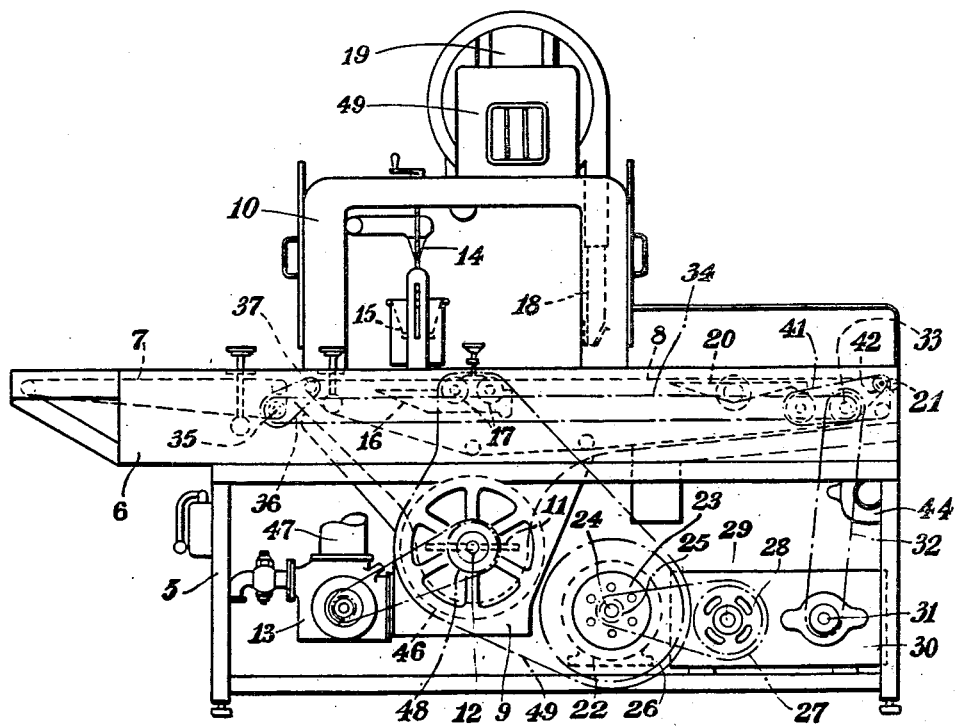
Figure 2:
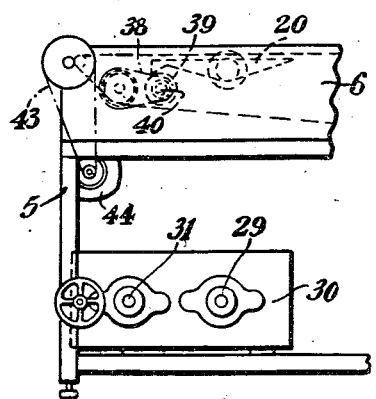

In the accompanying drawings:

Fig. 1 is a side elevation of one form of chocolate enrobing machine embodying the present invention, and Fig. 2 is a fragmentary view taken from the other side of the machine.

In the example illustrated, the invention is applied to a chocolate enrobing machine designed for the treatment of ice-cream blocks and other confections such as biscuits and cakes.

Essentially, such machine comprises a main frame 5 supporting spaced side members 6 between which operate openwork conveyor bands 7, 8, arranged with their upper runs substantially coplanar, and electrically heated chocolate container 9 below the conveyor 8, and an enrober hood 10 above the latter.

The articles under treatment are to be transferred from the feed conveyor 7 to the enrober conveyor 8 and, whilst on the latter, to be coated with chocolate in the manner hereinafter described.

The molten chocolate, continuously stirred by an agitator 11 whose shaft 12 passes horizontally through the container 9, is delivered by a pump 13 to a nozzle 14 within the enrober hood 10. This nozzle 14 discharges into a hopper 15 from which continuous "curtains" of chocolate fall, through the openwork conveyor 8, into a collecting tray 16, whose overflow returns to the container 9.

The chocolate collected in the tray 16 is picked up by two horizontal rollers 17 which co-operate to produce an upsurge of the coating substance against the underside of the articles on the conveyor 8, such articles having previously been coated at their tops and sides by passage through the "curtains" falling from the hopper 15.

Excess coating substance is blown from the articles aforesaid by means of an air-blast from a nozzle 18 connected to a fan 19 on top of the hood 10, and thereafter the conveyor 8 carries the coated articles past a vibrator 20 and an anti-tailing roller 21 which collectively improve the final appearance of their coatings.

The machine is individually operated by an electric motor 22 of (say) 1 hp., which is supported within the frame 5 and drives, through a friction clutch 23, a mainshaft 24 carrying sprockets 25, 26.

The sprocket 25 is connected by a chain 27 to a sprocket 28 on the input shaft 29 of a variable speed gear box 30 which has a maximum reduction ratio of (say) 6 to 1, the output shaft 31 of such gear box driving, through a chain 32, a sprocket shaft 33 in engagement with the lower run of the enrobing conveyor 8.

The sprocket shaft 33 itself drives through a chain 34, the corresponding shaft 35 of the feed conveyor 7, and there may be a further chain-drive, as at 36, from the shaft 35 to the front end roller 37 of the conveyor 8. The latter is run at a slightly higher speed than the conveyor 7, so that the articles to be treated are automatically separated during transference from one conveyor to the other.

A second chain drive 38 from the sprocket shaft 33 rotates a ratchet wheel 39 to actuate the conveyor vibrator 20 (Fig. 2), and the shaft 40 carrying the wheel 39 may be connected by a chain 41 to the rear-end roller 42 of the conveyor 8. The anti-tailing roller 21 is shown belt-driven, as at 43, from a separate motor 44, but it may obviously be indirectly operated by the main motor 22.

The mainshaft sprocket 26 may be connected by a single chain 45 to a sprocket 46 on the agitator shaft 12 and sprockets associated with the surge rollers 17, the manner in which the chain 45 is led around these latter sprockets determining whether the rollers 17 are driven in the same or opposite directions to vary the height of the chocolate surge in relation to the conveyor 8.

The chocolate pump 13 is chain driven, as at 47, from a second sprocket 48 on the agitator shaft 12, and any one of the various shafts driven by the motor 22 may be directly or indirectly connected to the blower fan 19, or alternatively the latter may have its own driving motor as at 49.

An enrobing machine provided with the drive arrangement above described may be constructed as a complete unit so that after installation thereof it is only necessary to connect the main motor 22 (and the auxiliary motors 44, 49, if provided) to a suitable source of electrical supply.

It is usually possible for all the shafts to be mounted in sealed ball bearing housings, and it has been found that a machine with the improved drive arrangement is very economical in power consumption as well as having a very high safety factor.

We claim:

1. In a coating machine, in combination, a supporting frame; a main conveyor for supporting the article to be coated during coating thereof, said main conveyor being movably mounted on said frame; an auxiliary conveyor for feeding the articles to said main conveyor, said auxiliary conveyor also movably mounted on said frame; a vessel for the coating substance mounted on said frame; agitating means in said vessel for agitating the coating substance; circulating means for said coating substance also mounted on said frame; a main driving member mounted on said frame; constant speed drive transmitting means driven by said main driving member and driving said agitating means and said circulating means for said coating substance at a constant speed determined exclusively by the speed of said main driving member; drive transmitting means driven also by said main driving member and driving said auxiliary conveyor and said main conveyor at such relative speed that the speed of said auxiliary conveyor is lower than the speed of said main conveyor and the relation between said speeds is maintained constant; and speed varying means including and forming part of said latter drive transmitting means so as to enable driving of said conveyors at a variable speed, the absolute values of which are independent of the speed of said main driving member while the relation between these values remains constant whereby the relation between the absolute speeds of movement of said auxiliary and main conveyors for the articles to be coated is maintained constant while they may be adjusted as one unit independently of the operation of said agitating and circulating means for the coating substance thus obtaining the required transportation speeds for the articles to be coated without affecting the agitation and circulation of the coating substance.

2. In a coating machine, in combination, a supporting frame; a conveyor for the article to be coated being movably mounted on said frame; a vessel for the coating substance mounted on said frame; agitating means in said vessel for agitating the coating substance; circulating means for said coating substance also mounted on said frame; a main driving member mounted on said frame; constant speed drive transmitting means driven by said main driving member and driving said agitating means and said circulating means for said coating substance at a constant speed determined exclusively by the speed of said main driving member, said constant speed drive transmitting means including a friction clutch between said main driving member and said agitating means; and variable speed drive transmitting means driven also by said main driving member and driving said conveyor at a variable speed and the absolute value of which is independent of the speed of said main driving member, whereby the speed of movement of said conveyor for the articles to be coated may be adjusted independently of the operation of said agitating and circulating means for the coating substance, thus obtaining the required transportation speed for the articles to be coated without affecting the agitation and circulation of the coating substance.

3. In a coating machine, in combination, a supporting frame; a perforated conveyor for the article to be coated being movably mounted on said frame; a vessel for the coating substance mounted on said frame; agitating means in said vessel for agitating the coating substance; circulating means for said coating substance also mounted on said frame; pick-up rollers mounted on said frame beneath said conveyor for delivering the coating substance to the bottom of the articles on said conveyor; a main driving member mounted on said frame; constant speed drive transmitting means driven by said main driving member and driving said agitating means, said circulating means for said coating substance and said pick-up rollers at a constant speed determined exclusively by the speed of said main driving member; and variable speed drive transmitting means driven also by said main driving member and driving said conveyor at a variable speed the absolute value of which is independent of the speed of said main driving member, whereby the speed of movement of said conveyor for the articles to be coated may be adjusted independently of the operation of said agitating and circulating means for the coating substance, thus obtaining the required transportation speed for the articles to be coated without affecting the agitation and circulation of the coating substance.

References Cited in the file of this patent

UNITED STATES PATENTS

| | | |
|---|---|---|
| 1,323,948 | Bausman | Dec. 2, 1919 |
| 1,424,232 | Beers et al. | Aug. 1, 1922 |
| 1,445,550 | Perkins | Feb. 13, 1923 |
| 1,602,712 | Segrin et al. | Oct. 12, 1926 |
| 2,347,164 | Petrilli | Apr. 18, 1944 |